Jan. 1, 1929. 1,697,516
H. S. HELE-SHAW ET AL
PACKING FOR VALVES, LIQUID LEVEL GAUGES, PISTON RODS,
PLUNGERS, AND THE LIKE
Filed April 26, 1921 4 Sheets-Sheet 2
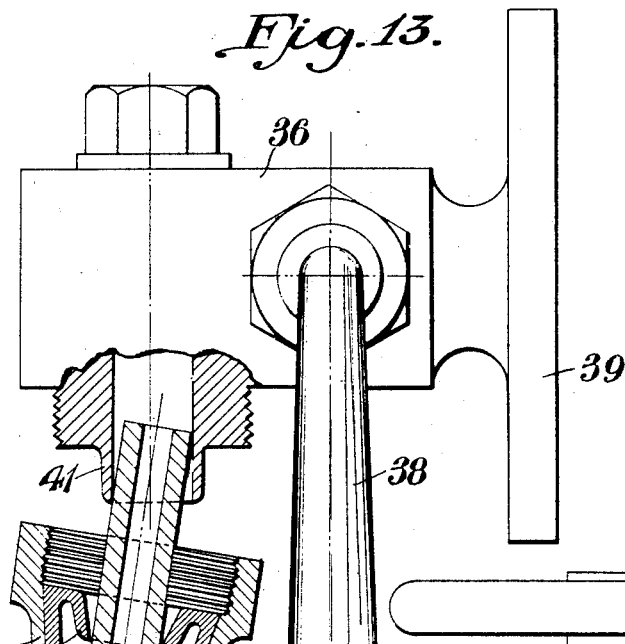
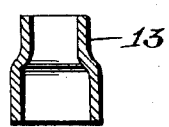
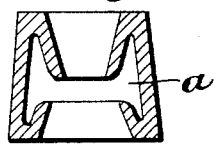
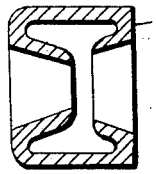
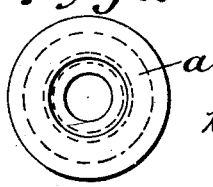

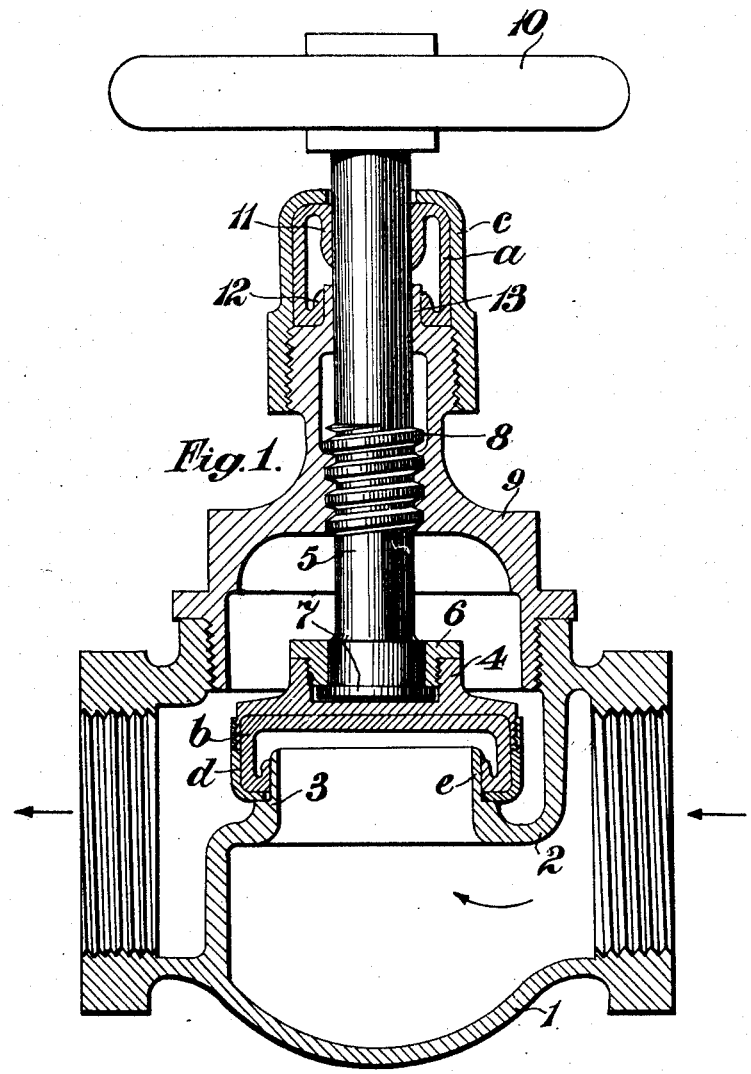

Jan. 1, 1929.                                                         1,697,516
                    H. S. HELE-SHAW ET AL
   PACKING FOR VALVES, LIQUID LEVEL GAUGES, PISTON RODS,
                    PLUNGERS, AND THE LIKE
              Filed April 26, 1921            4 Sheets-Sheet 3
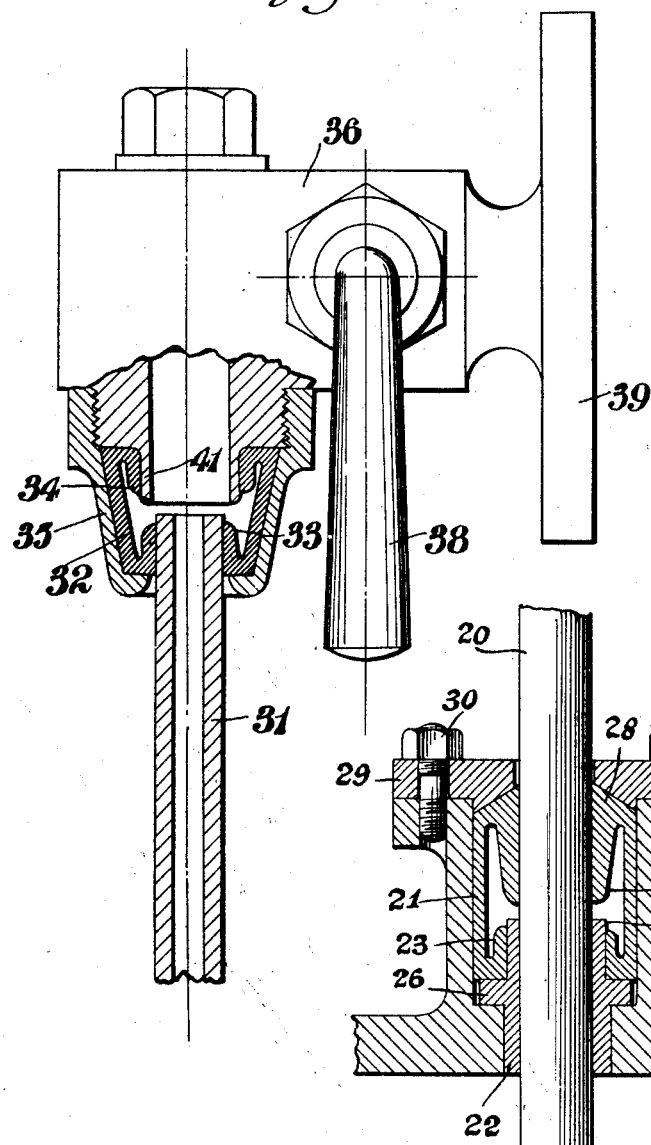

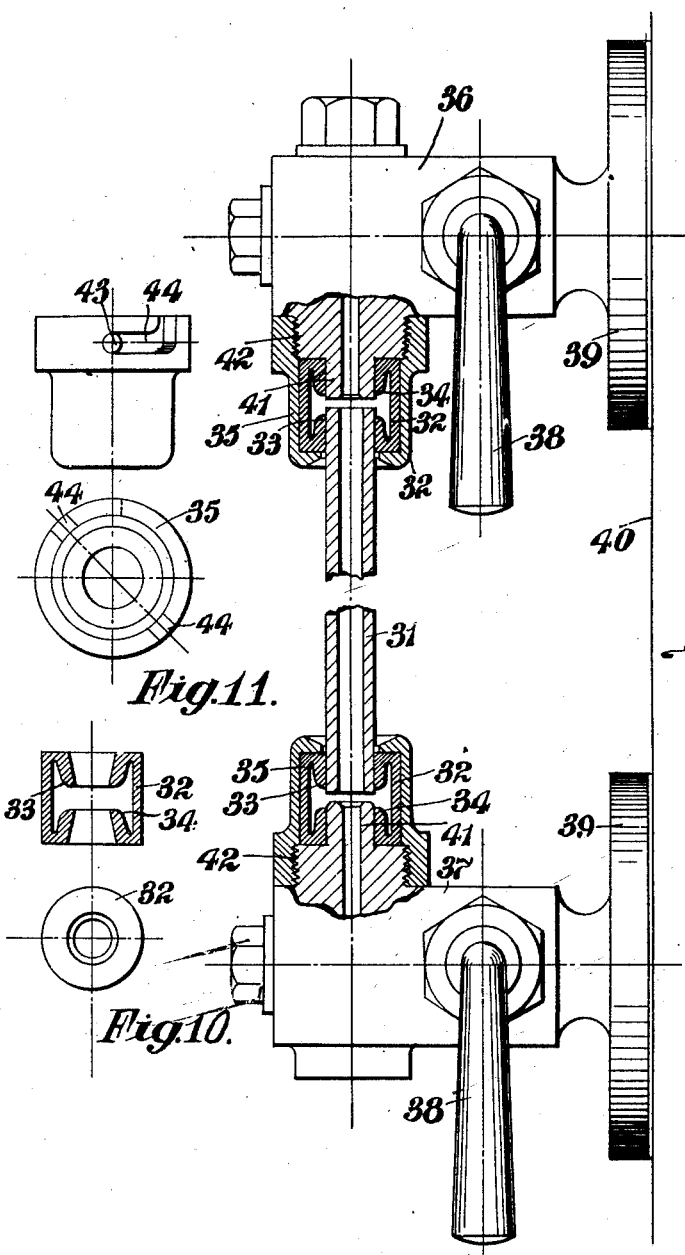

Patented Jan. 1, 1929.

1,697,516

UNITED STATES PATENT OFFICE.

HENRY SELBY HELE-SHAW AND ERNEST TRIBE, OF LONDON, ENGLAND.

PACKING FOR VALVES, LIQUID LEVEL GAUGES, PISTON RODS, PLUNGERS, AND THE LIKE.

Application filed April 26, 1921, Serial No. 464,663, and in Great Britain May 11, 1920.

This invention relates to a fluid tight gland packing for valves, liquid level gauges, piston rods, plungers, and like cylindrical members, and has for its object to provide improved and efficient means whereby such devices will be rendered leak-proof under all conditions of working.

The invention as applied to stop valves consists broadly in providing such a valve with a packing member for the spindle thereof, consisting of a ring of flexible material arranged in a gland or metallic housing and open to fluid pressure at its inner diameter. The ends or free edges of the packing member are inturned in such a manner as to be forced by fluid pressure tighter against their engaging surface. The packing member is made of a suitable flexible material such as rubber.

The invention further comprises a packing for piston rods, reciprocating valve spindles, pump plungers and the like, such packing consisting of a ring of flexible material arranged in a metallic housing or gland and open to fluid pressure at its inner diameter, and having its free edges inturned towards each other to form two co-axial bores so as to be forced by fluid pressure tighter against their engaging surfaces.

This construction of fluid-tight packing ring facilitates the manufacture thereof with the friction lips or edges at its rod or spindle engaging end of harder material than the other portions of the packing. These friction edges or lips are preferably made of a special material combining hardness and wearing properties.

According to the present invention as applied to a liquid level gauge of the glass tube kind, the bores of the upper and lower fittings arranged co-axial with the glass tube are formed in bosses extending towards the tube, and each of these bosses is adapted to receive the inturned edges or lips at the outer end of a fluid tight packing ring of the kind described above, the inturned edges at the other end of the ring being adapted to embrace one end of the glass tube. The bore in the lower fitting is preferably made of smaller diameter than the outside of the glass tube so that the said tube cannot pass into it, whereas the corresponding bore in the upper fitting may be made large enough to allow the glass tube to pass into it to facilitate the operation of removing and replacing a glass tube.

Various embodiments of the invention are illustrated in the accompanying drawings in which:—

Fig. 1 is a longitudinal section of a valve made in accordance with this invention, Figures 2 to 7, inclusive, are views of details of the packing member adapted to be applied to a valve spindle, Fig. 8 is a sectional view of the ring packing as applied to a piston rod, Fig. 9 is a sectional view of a liquid level gauge made in accordance with this invention, Fig. 10 is a plan and sectional elevation of the packing used in the gauge shown in Fig. 9, Fig. 11 is one form of housing cap for the packing shown in Fig. 10, Fig. 12 is a sectional view of an alternative construction of the gauge shown in Fig. 9, Fig. 13 is a view of the gauge shown in Fig. 12, illustrating the method of inserting the glass tube in position.

In Figs. 1 to 7 $a$ is the spindle packing member and $b$ the valve packing member, and $c$ and $d$ the housings thereof.

In Figure 1, the valve body 1 of a well known type of lift valve is constructed with a valve seating $e$ in the form of an annular projection extending upwards from the dividing partition 2 of the valve body. This sleeve or annular projection $e$ forms an extension of the bore 3 extending through the partition 2, and is turned on its outside to be engaged by the inturned edges of the cup $b$ of flexible material. This cup is enclosed within an annular housing $d$ screwed on to a valve supporting member 4, rotatably mounted on the end of the valve spindle 5 by means of a nut 6 and flange 7. The valve spindle 5, as in the usual manner in this type of valve, is provided with a screw thread 8 adapted to fit a tapped hole in a spindle cap 9 screwed into the valve body, the spindle being provided with a hand operating wheel 10.

On the upper end of the spindle cap 9 is screwed a housing $c$ bored to receive a leak-preventing ring $a$ of flexible material open at its inner side to fluid pressure between inturned ends or edges 11 and 12. The edge 11 engages the valve spindle 5, while the edge 12 engages a sleeve or annular projection 13 formed on the spindle cap 9 and through which the spindle extends. By this construction a spindle gland packing is provided which is rendered leak-proof by the internal pressure therein of the fluid passing through the valve.

In the modification of the spindle gland packing shown in Fig. 2, which shows the improved gland packing device adapted to replace the gland ring and stuffing box of a stop valve of usual pattern, the sleeve or annular member 13 is made of a separate piece forced into the stuffing box opening in the spindle cap 9 and rendered leak-proof by a soldered joint 14. An alternative form of the member 13 is shown in section in Figure 5.

Figure 3 is a sectional elevation, and Figure 4 an end view, of a leak-preventing ring $a$ having a conical outer surface adapted for use with a correspondingly shaped housing. The inturned edges are arranged to form conical bores so that when they are placed in position on the spindle 5 and the sleeve or annular member 13, their inner ends will grip the said spindle and sleeve with a greater pressure than their outer ends, and thereby produce a fluid tight joint of maximum efficiency. It will be understood that the smaller end of the bore through the inturned edges of the packing member is of smaller diameter than its engaging surface.

In the example of leak-proof ring shown in sectional elevation in Figure 6 and in end view in Figure 7, the inturned lips or edges are of the same construction as shown in Figures 3 and 4, the outside of the ring is however, of the shape required for use in the gland or housing shown in Figure 2.

In the piston rod stuffing box packing shown in Figure 8, 20 is the sliding or reciprocating rod, 21 the leak-preventing ring packing open at its inner side to fluid pressure escaping between the rod 20 and the nipple or bushing 22 and passing between its inturned ends or edges 23 and 24. The nipple or bushing 22 is fitted in a hole bored in the cylinder cover 25 at the base of the stuffing box or housing and provided with a flange fitting against said cover. The inturned edges 23 and 24 of the packing ring 21 extending towards each other form two co-axial bores, the bore formed by the edges 23 being of larger diameter than that formed by the edges 24. The nipple or bushing 22 is provided with an extension 22$^a$ adapted to be engaged by the inturned edges 23 of the larger bore of the ring 21, while the inturned edges 24 of the packing ring fit directly on to the rod 20. The outer end 28 of the packing ring is made conical and fits in a conical recess formed in the gland or cover 29 which is secured to the stuffing box in the usual manner by screws 30, 30. The outer surface of the packing ring 21 fits against the walls of the stuffing box bore which form a housing for it.

A similar construction is used for a reciprocating valve rod or the plunger of a pump or similar appliance.

In the liquid level gauges illustrated by Figures 9 to 13, 31 is the glass tube of the gauge, 32, 32 the packing rings, 33 and 34 the inturned ends or edges thereof, while 35, 35 are the ring housing caps. 36 and 37 are the ordinary gauge glass fittings provided with cocks having handles 38 and adapted to be secured by flanges 39, in the usual manner, to the vessel of which the side is indicated at 40.

The gauge fittings 36 and 37 are each provided with projecting bosses or sleeves 41, adapted to be engaged by the inturned edges 34 of the ring packing 32, while the outer edges 33 of the ring packing engage directly the ends of the glass tube 31.

The housing caps 35 in which the outer surface of the packing ring fits are screw threaded to fit on correspondingly threaded portions 42, 42, formed on the gauge fittings 36 and 37.

The housing caps 35 instead of being screwed on the gauge fittings may be secured thereon by a bayonet joint as shown in Figure 11, wherein a bayonet pin 43 and another one arranged diametrically opposite to it are secured on a plain turned portion extending from the gauge fittings 36 and 37, respectively. These pins 43 are adapted to be engaged by the bayonet slots 44, 44 when the housing caps are assembled in position on the gauge fittings, and so hold the gauge glass 31 in axial alignment with bores in the fittings open to the liquid in the vessel 40. It will thus be seen that ring caps 35 hold the glass tube 31 in position on the gauge without being in contact with any metal portions of the gauge fittings, the distance between the ends of the projecting bosses 41 being a little greater than the length of the glass tube, and that the gauge glass tube can be readily placed in position by placing the caps with the rings therein on to the glass tube, and when in position screwing or securing the caps to the said fittings.

In Figure 10 the bores in the inturned ends or edges of the packing ring are conical so that the inner ends of the said edges will grip their engaging surfaces with greater pressure than the outer ends.

In the alternative construction shown in Figures 12 and 13, the bore in the upper gauge fitting is made of larger diameter than the glass tube so that when inserting a glass tube in the gauge it can be inserted therein as shown in Figure 13, and thereby avoid the necessity of removing both the upper and lower ring housing caps. This construction necessitates a larger boss or sleeve 41 than is required in the gauge shown in Figure 9 where the said boss or sleeve is substantially of the same diameter as the glass tube. This increase in size of sleeve or boss also necessitates a corresponding increase in the size of one end of the packing ring, and to facilitate this construction the outer surface of each ring and its engaging bore in the ring housing cap are adapted to fit one another as clearly shown in Figures 12 and 13.

What we claim and desire to secure by Letters-Patent is:—

1. In combination a packing retaining housing, a cylindrical member extending through the said housing, a packing ring of flexible material fitting in said housing and having inturned ends extending towards each other to form two coaxial bores, a tubular projection extending into the packing ring and engaging the cylindrical member, said tubular projection being engaged by one of said inturned ends of said ring while the other inturned end thereof engages the cylindrical member.

2. In combination a packing retaining housing, a cylindrical member extending through said housing, a packing ring of flexible material fitting in said housing and having inturned ends extending towards each other to form two coaxial bores of different diameters, a tubular projection extending into the packing ring and engaging the cylindrical member, said tubular projection being engaged by the inturned end of the said ring having the larger bore while the said end thereof having the smaller bore engages the cylindrical member.

3. In combination a packing retaining housing, a longitudinally movable rod extending through the housing, a packing ring of flexible material fitting in the said housing and having inturned ends extending towards each other to form two coaxial bores of different diameters, a tubular projection extending into the packing ring and engaging the said rod, said tubular projection being engaged by the inturned end of the ring having the larger bore while the said end thereof having the smaller bore engages the said rod.

4. In combination a packing retaining housing, a cylindrical member passing through said housing, a packing ring of flexible material within the housing and having inturned ends extending towards each other to form two coaxial bores of different diameters, a nipple disposed adjacent one end of said housing projecting into the housing and engaging the said inturned end having the larger bore, the inturned end having the smaller bore engaging the said cylindrical member.

5. In combination a packing retaining housing provided with an opening at its bottom, a longitudinally movable rod passing through said housing and projecting through the said opening, a packing ring of flexible material fitting said housing and having inturned ends extending towards each other to form two coaxial bores of different diameters, the top of the housing engaging the outer end of the packing ring, a flanged nipple fitting the said opening in the bottom of the housing, said nipple being disposed coaxially of the said rod and engaging both the said rod and the said inturned end having the larger bore, and the inturned end having the smaller bore engaging the said rod.

6. The combination of a fitting provided with an opening and with an outwardly extending annular nipple surrounding the opening, a packing ring of flexible material having inturned ends extending towards each other to form two coaxial bores, said nipple extending into and engaged by one inturned end of said packing ring, a cylindrical member extending into and engaged by the other inturned end of said packing ring, and a housing surrounding said ring and engaging the outer end portion thereof and having screw thread engagement with said housing.

In witness whereof we affix our signatures.

HENRY SELBY HELE-SHAW.
ERNEST TRIBE.